United States Patent [19]
Tenev et al.

[11] Patent Number: 6,108,698
[45] Date of Patent: Aug. 22, 2000

[54] NODE-LINK DATA DEFINING A GRAPH AND A TREE WITHIN THE GRAPH

[75] Inventors: Tichomir G. Tenev, San Jose; Ramana B. Rao, San Francisco, both of Calif.; Harold J. Shinsato, Jr., Missoula, Mont.; John O. Lamping, Los Altos, Calif.

[73] Assignee: Xerox Corporation, Stamford, Conn.

[21] Appl. No.: 09/124,338

[22] Filed: Jul. 29, 1998

[51] Int. Cl.[7] .................................................. G06F 13/00
[52] U.S. Cl. ........................ 709/220; 709/252; 345/356
[58] Field of Search .................................. 709/220, 221, 709/222, 252, 253; 345/356, 357

[56] References Cited

U.S. PATENT DOCUMENTS

| | | | |
|---|---|---|---|
| 5,337,404 | 8/1994 | Baudelaire et al. | 395/141 |
| 5,394,556 | 2/1995 | Oprescu | 709/220 |
| 5,414,836 | 5/1995 | Baer et al. | 714/38 |
| 5,515,487 | 5/1996 | Beaudet et al. | 395/140 |
| 5,590,250 | 12/1996 | Lamping et al. | 395/127 |
| 5,619,632 | 4/1997 | Lamping et al. | 395/141 |
| 5,784,557 | 7/1998 | Oprescu | 709/220 |

OTHER PUBLICATIONS

Beckett, J., "Computer Whiz Burns to Learn, Ramana Rao wields technology smarts at Xerox startup," *San Francisco Chronicle*, Jun. 4, 1998.

Beier, T., and Neely, S., "Feature–Based Image Metamorphosis," *SIGGRAPH '92, Computer Graphics Proceedings*, vol. 26, No. 2, Chicago, Jul. 1992, pp. 35–42.

Fairchild, K. M., Poltrock, S.E., and Furnas, G.W., "Sem-Net: Three–Dimensional Graphic Representations of Large Knowledge Bases," in Guindon, R., Ed., *Cognitive Science and its Application for Human Computer Interaction*, Lawrence Erlbaum, Hillsdale, N.J., 1988, pp. 201–233.

Koike, H., and Yoshihara, H., "Fractal Approaches for Visualizing Huge Hierarchies," *Proceedings of 1993 IEEE/CS Symposium on Visual Languages*, Aug. 24–27, 1993, pp. 55–60.

Lamping, J. and Rao, R., "The Hyperbolic Browser: A Focus+Context Technique for Visualizing Large Hierarchies," Sep. 5, 1995.

Matsuura, T., Taniguchi, K., Masuda, S., and Nakamura, T., "A Graph Editor for Large Trees with Browsing and Zooming Capabilities," *Systems and Computers in Japan*, vol. 24, No. 8, 1993, pp. 35–46.

(List continued on next page.)

*Primary Examiner*—Viet D. Vu

[57] ABSTRACT

Node-link data defining a graph also include tree defining data. The node-link data with the tree defining data further define a tree within the graph. The tree defining data indicate a set of elements in the graph that are represented in the tree. Each of a subset of elements in the set is represented more than once in the tree. For at least one element in the subset, the tree defining data indicate which representations of the element have descendants in the tree and which representations have none. The tree defining data can, for example, be expansion flags for links in the graph that are in the set of elements, with each links expansion flag indicating whether the link's to-node is expanded or contracted in the tree. In response to each of a series of expand and contract signals from a user, an iteration can modify the tree defining data and use it to present a representation of the graph with the indicated node expanded or contracted as requested.

15 Claims, 9 Drawing Sheets

OTHER PUBLICATIONS

Munzner, T., Burchard, P., and Chi, E.H., "Visualization through the World Wide Web with Geomview, Cyberview, W3Kit, and WebOOGL," a single page hardcopied from the Web site designated by the URL http://www.ncsa.uiuc.edu/SDG/IT94/Proceedings/VR/munzner/munzner–abstract.html. Hardcopy of changes file from the Web site designated by the URL http://www.geom.umn.edu/software/download/geomview.html, bearing date Oct. 21, 1994.

Munzner, T., and Burchard, P., "Visualizing the Structure of the World Wide Web in 3D Hyperbolic Space," hardcopied from Web site URL http://www.geom.umn.edu:80/docs/research/webviz/ and following sequence of nodes, dated Nov. 21, 1995, also published in Proceedings of VRML '95, (San Diego, CA, Dec. 14–15, 1995), special issue of Computer Graphics, ACM SIGGRAPH, New York, 1995, pp. 33–38 & 138.

Walsh, J., "Web site development, InXight interface adds animation to site maps," *INFOWORLD*, May 18, 1998.

NODE-LINK DATA DEFINING A GRAPH AND A TREE WITHIN THE GRAPH

FIELD OF THE INVENTION

The invention relates to node-link structures defining graphs and trees, where both graphs and trees are categories of node-link structures.

BACKGROUND AND SUMMARY OF THE INVENTION

Lamping, J. and Rao, R., "The Hyperbolic Browser: A Focus+Context Technique for Visualizing Large Hierarchies", *Journal of Visual Languages and Computing*, Vol. 7, 1996, pp. 33–55, disclose techniques for presenting trees, and discuss whether the same techniques can be extended to visualize more general graph structures. To solve the problem of crossing links, a graph could be converted to a tree by making a breadth-first traversal of the graph, copying each graph node for each incoming edge, so that each edge goes to its own copy of the node. The children of the node are attached only to one of the copies, referred to as the main node. The other copies of the node can be presented differently than the main node, such as with a different colored background. When one of the other copies is selected by the user, an animated transition can move the main copy of the node into focus. An alternative approach would be to give all copies of a node a copy of the descendant hierarchy. Lamping et al., U.S. Pat. No. 5,590,250, similarly mentions a variation in which node-link data defining all web pages of a network could be obtained by converting the web pages to a tree using an appropriate pruning constraint.

Munzner, T., and Burchard, P., "Visualizing the Structure of the World Wide Web in 3D Hyperbolic Space", in *Proceedings of the VRML '95 Symposium* (San Diego, Calif., Dec. 13–16, 1995), ACM SIGGRAPH, 1995, pages 33–38 and 138, disclose that, although the World Wide Web is non-linear, a tree can be imposed starting at any document, with the chosen node the root, each outgoing link a first-generation child, the links in these documents grandchildren, and so on. Munzner et al. also disclose techniques based on laying out an exhaustive subtree of a graph in standard hyperbolic space. The choice of an exhaustive subtree corresponds to choosing a root node and, for each other node, one incoming edge. Taking the tree that would be obtained by navigating out from the root node and attaching all children, a subtree can be selected by choosing a traversal order for the tree and then only retaining the first copy of each graph node.

Beaudet et al., U.S. Pat. No. 5,515,487, disclose selective display of portions of graphs by expanding and collapsing nodes in trees, directed acyclic graphs, and cyclic graphs, while retaining information concerning all node interconnections so that information can be correctly recalled as required. Nodes are selected for modification, all nodes connected to each selected node are assigned to a first set of nodes, and then each node is removed from the first set of nodes and assigned to a second set, together with any connected nodes that are not in the first set. The identified nodes are deleted from the display, and each node connected to a deleted node is highlighted, surrounded by an outline box, shown with outgoing arcs, or otherwise shown in a way that distinguishes collapsed nodes.

The invention addresses problems in using trees to represent graphs that are not trees, referred to herein as "non-tree graphs". Some previous techniques, including those described by Lamping and Rao and also by Munzner and Burchard, convert a graph to a tree, possibly resulting in a loss of information about some nodes and links. Other previous techniques, exemplified by Beaudet et al., U.S. Pat. No. 5,515,487, retain information about a graph even though the graph is modified for display, such as by deleting nodes connected to a node selected by a user, but do not provide a way to automatically present a tree representing a non-tree graph.

The invention provides techniques that alleviate these problems. The techniques provide node-link data defining both a graph and a tree within the graph. Defining the "elements" of the graph to include all of its nodes and links, a tree is "within" a graph if all the elements of the tree represent elements of the graph, with some elements of the graph possibly represented more than once in the tree. The node-link data include tree defining data that indicate, for each of a set of elements in the graph, whether the element is represented in the tree. In addition, a subset of the elements of the graph are represented more than once in the tree. For at least one element in the subset, the tree defining data indicate which of its representations are expanded and which are contracted; the term "expanded" is used here to mean that a representation of an element in the tree has one or more descendants, in contrast to a "contracted" representation of the element, which has no descendants in the tree even though it could based on the structure of the graph.

Tree defining data as described above make it possible to automatically present a tree representing a non-tree graph; specifically, the tree defined by the tree defining data can be presented, such as on a display. If the graph includes a cycle, for example, the tree defining data can indicate that an element in the cycle is represented in the tree, yet avoid infinite branches in the tree by indicating that certain representations of the element in the tree have no descendants.

One technique according to the invention provides an especially simple solution to the problem of cycles. This technique maintains the tree defining data so that at most one representation of an element in the graph is expanded in the tree. As a result, a downward path from the root node of the tree cannot include more than two occurrences of the element, ensuring that a cycle through the element in the graph will not cause problems in the tree.

Another technique according to the invention addresses the problem of reducing the size of the tree defining data in the case of a directed graph or another graph that can be treated as a directed graph. The technique defines a tree within the graph simply by indicating an appropriate set of links. In effect, each link in the set can be represented by a link in the tree, and nodes occur in the tree only where links meet, forming a tree of links. Besides its usefulness in obtaining a representation of a graph, a tree of links defined in this way could be used to mathematically derive the tree's characteristics.

Tree defining data according to this technique can, for example, be implemented as expansion/contraction data indicating, for each link in the set of elements, whether the link representing it in the tree leads to a node, referred to as its "to-node", that is expanded. If the to-node is expanded, the tree also includes links representing the outgoing links of the to-node in the graph. Thus, the expansion/contraction data define the set of links in the tree by indicating, for each link in the set, whether the outgoing links of its to-node are in the set. As used herein, expansion/contraction data "indicate a link is expanded" if the data indicate that the outgoing links of its to-node are in the set, while expansion/ contraction data "indicate a link is contracted" if the data indicate that the outgoing links of its to-node are not in the set.

Following this technique, a version of the tree can be produced in which each node in the graph is represented once in the tree for each of its incoming links in the set. Nodes in the graph with more than one incoming link in the set will be represented more than once in the tree. This version can then be used to produce a representation of the graph as a tree.

The two techniques described above can be combined to elegantly ensure that the expansion/contraction data for at most one incoming link of any node in the graph indicate that the node's representation is expanded in the tree, the expansion/contraction data for the node's other incoming links all indicating that the node's representation is contracted in the tree. As a result, a downward path from the root node of the tree cannot include more than two occurrences of the node.

The new techniques are advantageous because they can be used to obtain a tree that represents a non-tree graph, while retaining information about the graph that is not reflected in the tree. For example, the new techniques can be used to automatically present a tree that represents a non-tree graph.

Because they preserve the data defining the underlying graph, the new techniques can also be used in a variety of situations in which it is desirable to present a number of different trees, each representing the graph differently. For example, if a user requests that a node in the tree be expanded or contracted, the expansion/contraction data can be modified so that a different tree is defined in the graph, with the node expanded or contracted as requested. The different tree can then be presented on a display.

The following description, the drawings, and the claims further set forth these and other aspects, objects, features, and advantages of the invention.

DETAILED DESCRIPTION OF THE INVENTION

A. Conceptual Framework

Figure 1:
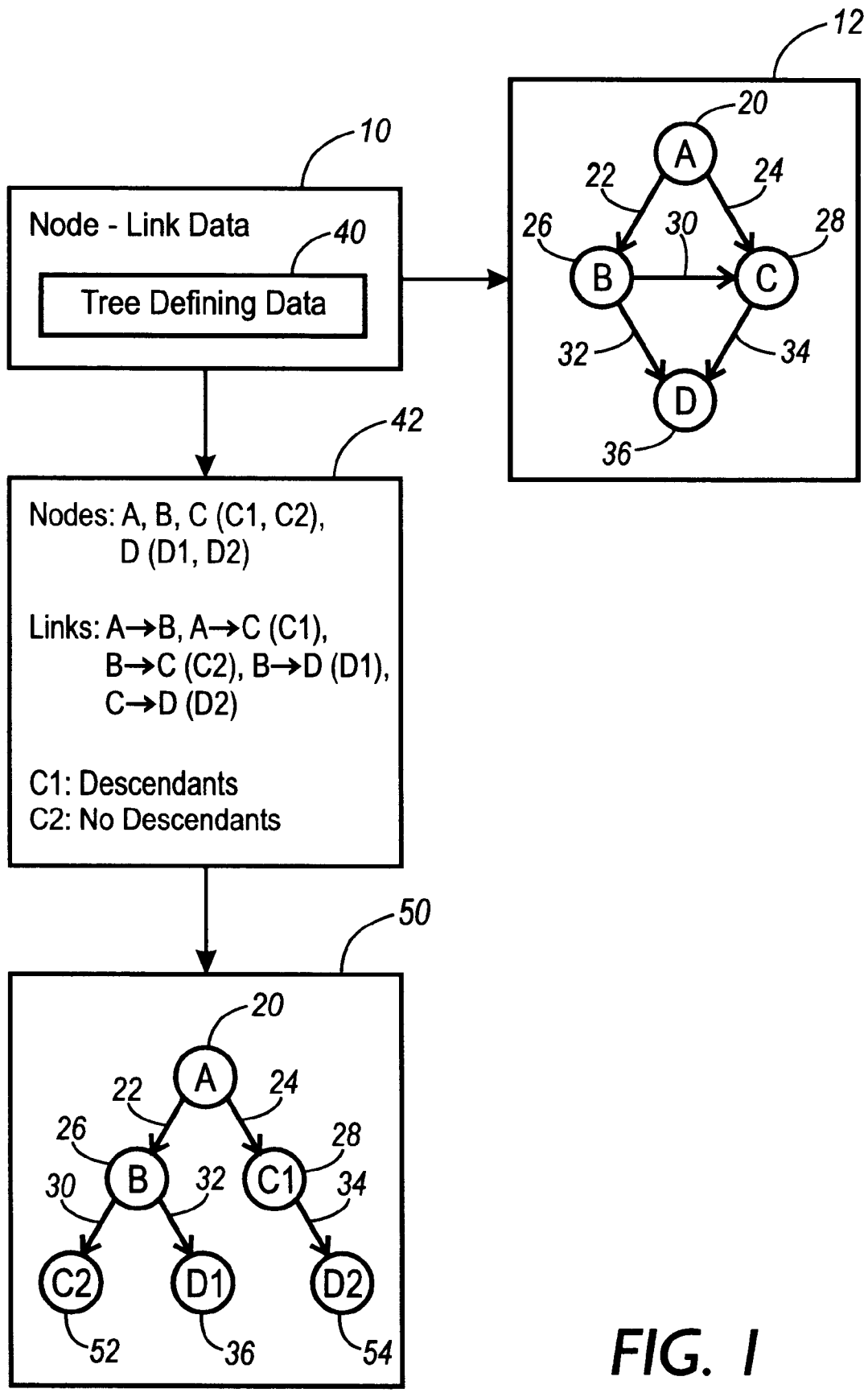
FIG. 1 is a schematic diagram showing how node-link data defining a graph can include tree defining data defining a tree within the graph.

The following conceptual framework, when taken with the conceptual frameworks set forth in U.S. Pat. Nos. 5,590,250 and 5,619,632, incorporated herein by reference, is helpful in understanding the broad scope of the invention, and the terms defined below have the indicated meanings throughout this application, including the claims.

A "node-link structure" is a structure that includes items that can be distinguished into nodes and links, with each link relating two or more of the nodes. A "graph" is a node-link structure in which each link relates two nodes. A "directed graph" is a graph in which each link indicates direction between the nodes it relates, with one node being a source or "from-node" of the link and the other being a destination or "to-node" of the link. An "acyclic directed graph" is a directed graph in which the links, when followed in their indicated directions, do not provide a path from any node back to itself. A "tree" is an acyclic directed graph with exactly one root node such that, for any non-root node in the tree, the links, when followed in their indicated directions, provide only one path that begins at the root node and leads to the non-root node.

The "elements" of a node-link structure are its nodes and links.

In a node-link structure, a "node-link relationship" is a relationship between elements based on paths of nodes and links between or among the elements.

In many cases, node-link relationships can be summarized by category. In a directed graph, for example, the "children" of an element are the elements that can be reached from the element by following no more than one link in its indicated direction. Similarly, the "parents" of an element are the elements that can be reached from the element by following no more than one link opposite its indicated direction. Children and parents of a node thus include links and nodes, while children and parents of a link include only nodes. The "descendants" of an element include all of its children, the children of its children ("grandchildren"), etc. The "ancestors" of an element include all of its parents, the parents of its parents ("grandparents"), etc. The "siblings" of an element include all the other children of its parents. The "co-parents" of an element include all the other parents of its children.

Node-link data "define a graph" if the node-link data include information indicating how a set of links relate a set of nodes and the links and nodes include all the elements of the graph.

Node-link data defining a graph "include" tree defining data if the tree defining data can be obtained by accessing or otherwise operating on the node-link data. The tree defining data can be in line and available for direct reference within the node-link data, with or without decoding, or the tree defining data can be available for indirect reference based on the node-link data. The node-link data could, for example, include a handle or a pointer leading to the tree defining data, such as a pointer to an array of pointers leading to the tree defining data. Or the tree defining data could be in a table or relational database, accessible using identifiers of elements of the node-link structure that can also be used to access the node-link data. Or the tree defining data could be in a defined position in memory relative to the node-link data. Or the tree defining data could be encoded within or otherwise embedded within the node-link data, such as in the form of a number of flags or the like.

A tree is "within" a graph if all the elements of the tree represent elements of the graph, with some elements of the graph possibly represented more than once in the tree.

Node-link data with tree defining data "define a tree" within the graph defined by the node-link data if the node-link data and the tree defining data together include information indicating how a subset of the elements of the graph are represented by elements of the tree, with all elements of the tree representing elements of the graph and with some elements of the graph possibly represented more than once in the tree.

A representation of an element in a graph "has descendants" or "is expanded" in a tree if the representation of the element has at least one child in the tree. A representation of an element in a graph "has no descendants" in a tree if the representation of the element has no children in the tree. A representation of an element in a graph "is contracted" in a tree if the representation of the element has no descendants in the tree even though it could based on the structure of the graph.

As used herein, a "series of iterations" is a series of operations that can be divided into two or more consecutive parts, each of which is referred to herein as an iteration. Although iterations in a series may differ significantly, each iteration after the first can typically use starting data produced by the preceding iteration to obtain ending data. Typically, each iteration's ending data can in turn be used by the following iteration as its starting data.

The term "navigation signal" is used herein to mean a signal that indicates that the user has greater interest in a part of a node-link structure than in other parts. For example, an "expand signal" indicates a request to present a representation of a graph in which the representation of an element of the graph is expanded, while a "contract signal" indicates a request to present a representation of a graph in which the representation of an element of the graph is contracted. Other examples include requests to present a part of the node-link structure at a specific position, which can be done by selecting a bookmark or the like or by a point and click operation requesting that a feature pointed to be moved to a center of focus.

A "processor" is a component of circuitry that responds to input signals by performing processing operations on data and by providing output signals. The input signals may, for example, include instructions, although not all processors receive instructions. The input signals to a processor may include input data for the processor's operations. The output signals similarly may include output data resulting from the processor's operations.

A "network" is a combination of circuitry through which a connection for transfer of data can be established between machines.

B. General Features

Figure 2:
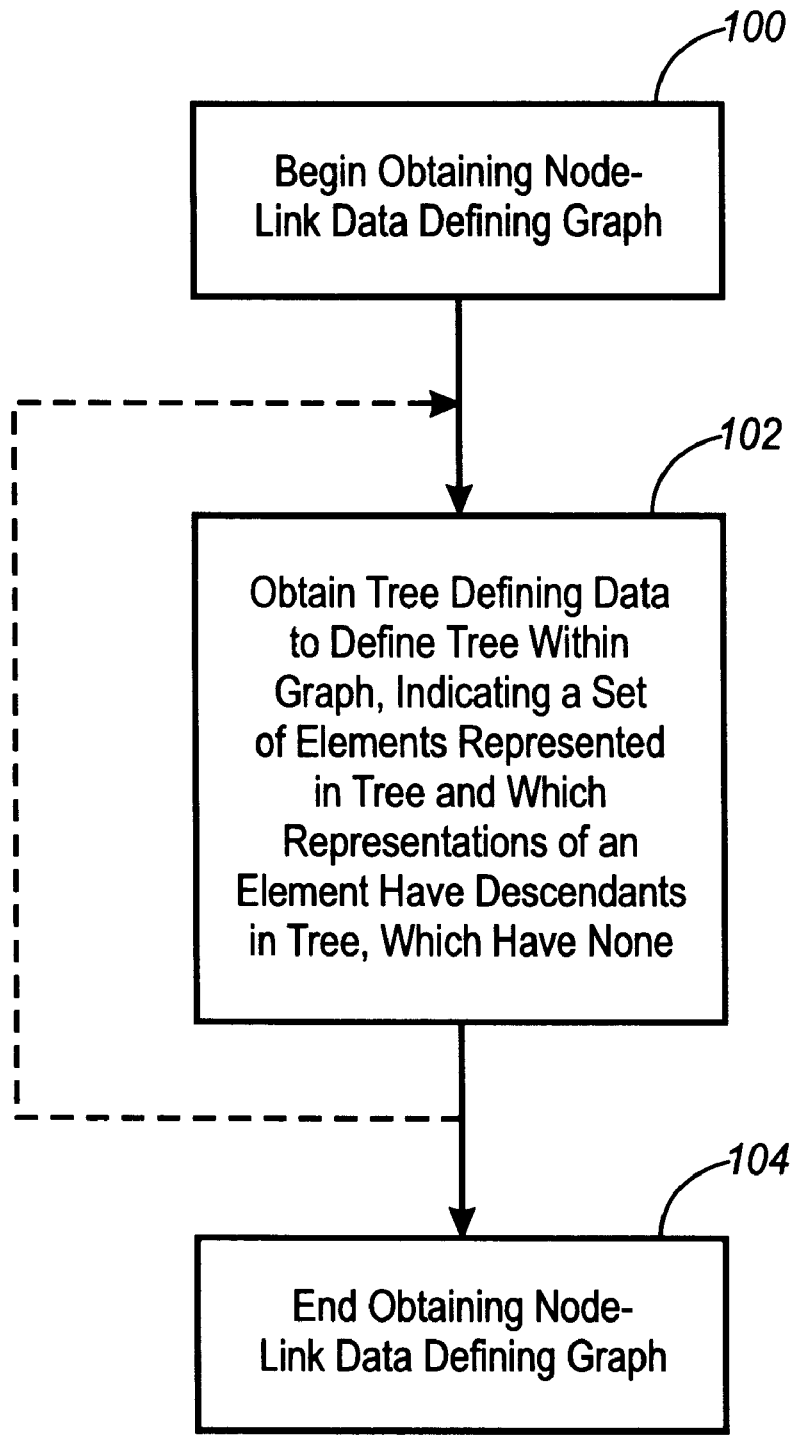
FIG. 2 is a flow chart showing general acts in obtaining node-link data that include tree defining data as in FIG. 1.
Figure 3:
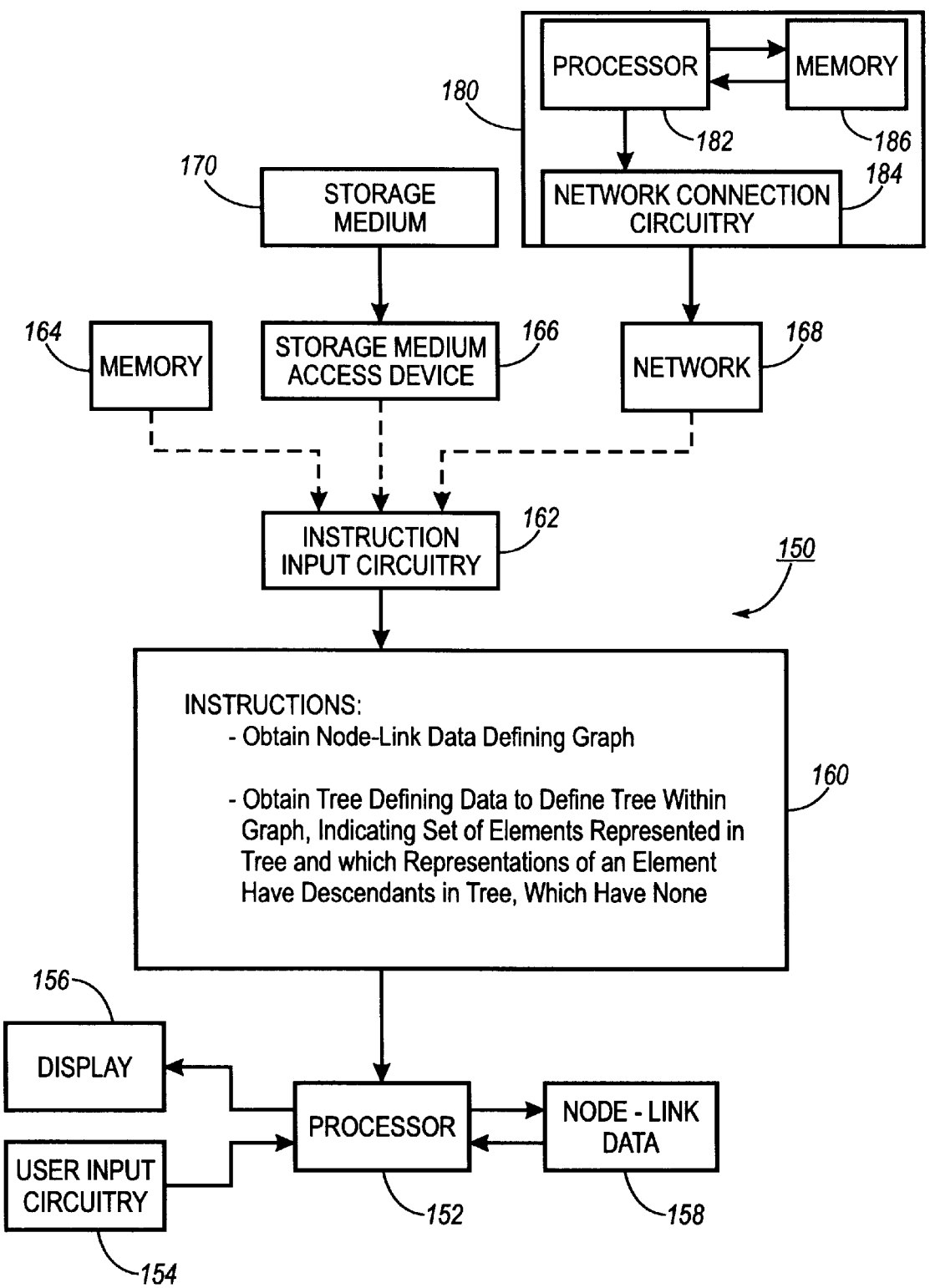
FIG. 3 is a schematic diagram showing general components of a machine that obtains node-link data that include tree defining data as in FIG. 1.

FIGS. 1–3 show general features of the invention.

The technique illustrated in FIG. 1 begins with node-link data 10, which define a graph. An illustrative example of a graph that could be defined by data 10 is schematically represented in box 12. Node 20 is labeled "A" and has outgoing links 22 and 24 to nodes 26 and 28, respectively. Node 26, labeled "B", has outgoing link 30 to node 28 labeled "C". Nodes 26 and 28 have outgoing links 32 and 34, respectively, both to node 36, labeled "D".

Even though node 20 resembles a root, the graph illustrated in box 12 is not a tree. Nodes 28 and 36 each have two incoming links, and therefore can each be reached by more than one path from node 20. But it is often convenient to represent a non-tree graph as a tree, such as when visually presenting representations of the non-tree graph.

Node-link data 10 therefore also define a tree within the graph. For this purpose, node-link data 10 include tree defining data 40 that indicate, for each of a set of elements in the graph, whether the element is represented in the tree. In addition, tree defining data 40 indicate, for at least one element that is represented more than once in the tree, which representations of the element in the tree have descendants and which do not. More specifically, tree defining data 40 illustratively indicate which representations of node 28 in the graph have descendants and which do not.

FIG. 1 illustrates example 42 of tree defining data 40. Various other examples (not shown) could alternatively be included in node-link data 10.

Data 42 indicate that the set of elements includes nodes 20, 26, 28, and 36, with nodes 28 and 36 each represented twice, i.e. C1, C2 and D1, D2. Data 42 also indicate that the set of elements includes links 22, 24, 30, 32, and 34. Data 42 indicate, however, that first representation of node 28 (C1) has descendants in the tree while the second representation (C2) has no descendants.

Data 42 therefore define the tree shown in box 50, in which, to the extent possible, representations of nodes and links have the same reference numerals as the nodes and links they represent in the graph in box 12. Node 28 (representation C1) has descendants, i.e. link 34 to node 54 (representation D2), a clone of node 36 (representation D1). In contrast, node 52 (representation C2), a clone of node 28, has no descendants.

Data 42 indicate, for node 28, that one representation of the node in the tree has descendants, and that the other representation of the node has none. As a result, the tree shown in box 50 is truncated. Even further truncation would result if tree defining data 40 were to indicate that neither representation of node 28 had descendants.

In FIG. 2, the act in box 100 begins obtaining node-link data defining a graph.

As part of obtaining the node-link data, the act in box 102 obtains tree defining data that are included in the node-link data. The node-link data with the tree defining data define a tree within the graph, with the tree defining data indicating a set of elements of the graph that are represented in the tree and indicating, for at least one element that has more than one representation in the tree, which representations have descendants in the tree and which have no descendants.

As suggested by the dashed line in FIG. 2, the act in box 102 could be performed repeatedly for the same graph, with each repetition obtaining different tree defining data. As a result, the node-link data with the tree defining data from each repetition could define a different tree within the graph. Each repetition could, for example, be an iteration that uses tree defining data from the preceding iteration to produce new tree defining data in response to a navigation signal or other event.

Finally, in box 104, the act of obtaining node-link data defining the graph ends.

Machine 150 in FIG. 3 includes processor 152 connected for receiving data indicating user signals from user input circuitry 154 and for providing data defining images to display 156. Processor 152 is also connected for accessing node-link data 158. Processor 152 is also connected for receiving instruction data 160 indicating instructions through instruction input circuitry 162, which can illustratively provide instructions received from connections to memory 164, storage medium access device 166, or network 168.

In executing the instructions indicated by instruction data 160, processor 152 obtains node-link data, which can be part or all of node-link data 158. The node-link data obtained by processor 152 define a graph. In executing the instructions to obtain the node-link data, processor 152 may make one or more calls to instructions that obtain tree defining data included in the node-link data. The node-link data with the tree defining data define a tree within the graph, with the tree defining data indicating a set of elements of the graph that are represented in the tree and indicating, for at least one element that has more than one representation in the tree, which representations have descendants in the tree and which have no descendants.

As noted above, FIG. 3 illustrates three possible sources from which instruction input circuitry 162 could receive data indicating instructions—memory 164, storage medium access device 166, and network 168.

Memory 164 could be any conventional memory within machine 150, including random access memory (RAM) or read-only memory (ROM), or could be a peripheral or remote memory device of any kind. More generally, memory 164 could be a combination of more than one type of memory component.

Storage medium access device 166 could be a drive or other appropriate device or circuitry for accessing storage medium 170, which could, for example, be a magnetic medium such as a set of one or more tapes, diskettes, or floppy disks; an optical medium such as a set of one or more CD-ROMs; or any other appropriate medium for storing data. Storage medium 170 could be a part of machine 150, a part of a server or other peripheral or remote memory device, or a software product. In each of these cases, storage medium 170 is an article of manufacture that can be used by machine 150. Data units can be positioned on storage medium 170 so that storage medium access device 166 can access the data units and provide them in a sequence to processor 152 through instruction input circuitry 162. When provided in the sequence, the data units form instruction data 160, indicating instructions as illustrated.

Network 168 can provide instruction data 160 received from machine 180. Processor 182 in machine 180 can establish a connection with processor 152 over network 168 through network connection circuitry 184 and instruction input circuitry 162. Either processor could initiate the connection, and the connection could be established by any appropriate protocol. Then processor 182 can access instruction data stored in memory 186 and transfer the instruction data over network 168 to processor 152 so that processor 152 can receive instruction data 160 from network 168. Instruction data 160 can then be stored in memory 164 or elsewhere by processor 152, and can be executed.

C. Implementation

The general features described above could be implemented in numerous ways on various machines to present node-link representations. An implementation described below has been implemented on a PC-based system running the 32 bit versions of Microsoft Windows and executing code compiled from C++ language source code.

C.1. Expansion/contraction Data

Figure 4:
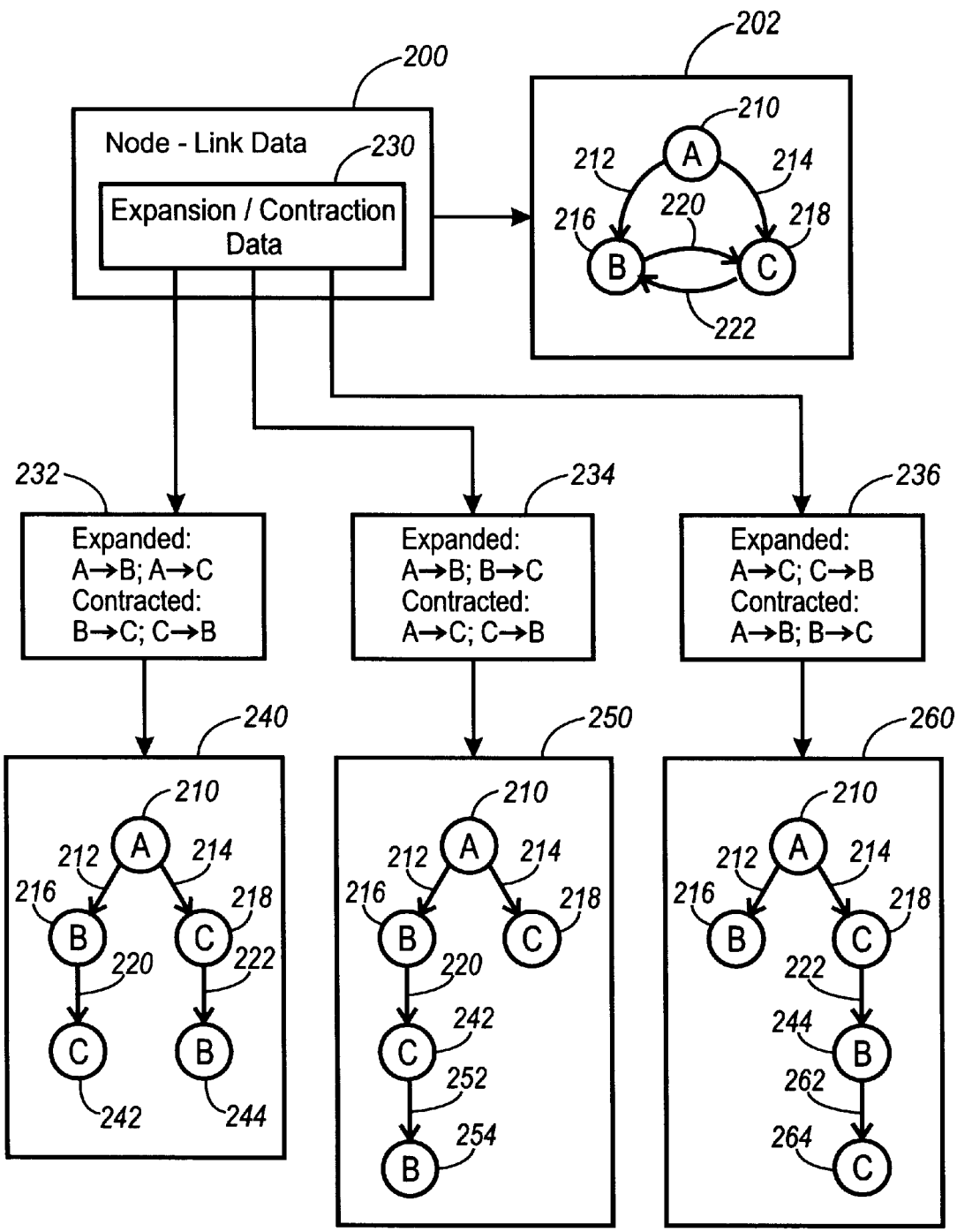
FIG. 4 is a schematic diagram showing how expansion/contraction data can define a tree within a directed graph.

FIG. 4 illustrates features of an implementation of the technique in FIG. 1, with the tree defining data implemented as expansion/contraction data indicating which links of a directed graph have to-nodes whose representations are expanded in a tree and which have to-nodes whose representations are contracted in the tree.

The implementation illustrated in FIG. 4 begins with node-link data 200, which define a graph. An illustrative example of a graph that could be defined by data 200 is schematically represented in box 202. Node 210 is labeled "A" and has outgoing links 212 and 214 to nodes 216 and 218, respectively. Node 216, labeled "B", has outgoing link 220 to node 218. Node 218, labeled "C", has outgoing link 222 to node 216.

Even though node 210 resembles a root, the graph illustrated in box 202 is not a tree. Nodes 216 and 218 each have two incoming links, and therefore can each be reached by more than one path from node 210. Also, the links between nodes 216 and 218 make the graph cyclic.

To make it possible to represent the graph in box 202 as a tree, node-link data 200 also define a tree within the graph. For this purpose, node-link data 200 include expansion/contraction data 230, an implementation of tree defining data that indicate, for each link in the graph, whether the representation of its to-node is expanded or contracted in the tree.

As can be understood from FIG. 4, expansion/contraction data as illustrated are sufficient to indicate the set of elements of a directed graph that are represented in a tree. Expansion/contraction data as illustrated also prevent cycles because the expansion/contraction data for at most one incoming link of any node in the graph indicate that the node's representation is expanded in the tree, the expansion/contraction data for the node's other incoming links all indicating that the node's representation is contracted in the tree.

FIG. 4 illustrates three examples 232, 234, 236 of expansion/contraction data 230. Any one or more of examples 232, 234, 236 could be included in node-link data 200, as could other examples not shown. For example, node-link data 200 could include two of examples 232, 234, 236, one defining a tree prior to a modification and the other defining a version of the tree after a modification.

Data 232 indicate that link 212 from node 210 to node 216 and link 214 from node 210 to node 218 are expanded, while links 220 and 222 between nodes 216 and 218 are contracted. Data 232 therefore define the tree shown in box 240, in which nodes 216 and 218 are both expanded. But because links 220 and 222 are contracted, the descendants of nodes 216 and 218, represented by nodes 242 and 244 respectively, are both contracted. Node 242 is a clone of node 218, while node 244 is a clone of node 216.

Data 234, in contrast, indicate that links 212 and 220 are expanded, while links 214 and 222 are contracted. Data 234 therefore define the tree shown in box 250, in which nodes 216 and 242 are both expanded, while node 218 is contracted. Node 242 has outgoing link 252, representing the same link as link 222, leading to node 254, a clone of node 216. Because link 222 is contracted, link 252 is similarly contracted, so that node 254 is contracted.

Data 236, in further contrast, indicate that links 214 and 222 are expanded, while links 212 and 220 are contracted. Data 236 therefore define the tree shown in box 260, in which nodes 218 and 244 are both expanded, while node 216 is contracted. Node 244 has outgoing link 262, representing the same link as link 220, leading to node 264, a clone of node 218. Because link 220 is contracted, link 262 is similarly contracted, so that node 264 is contracted.

Data 232, 234, 236 each indicate, for each of nodes 216 and 218, that one representation of the node in the tree is expanded, any other representation of each node being contracted. As a result, the trees shown in boxes 240, 250, and 260 are truncated. Even further truncation would result if, for one of nodes 216 and 218, expansion/contraction data 230 were to indicate that none of its representations were expanded.

C.2. System

Figure 5:
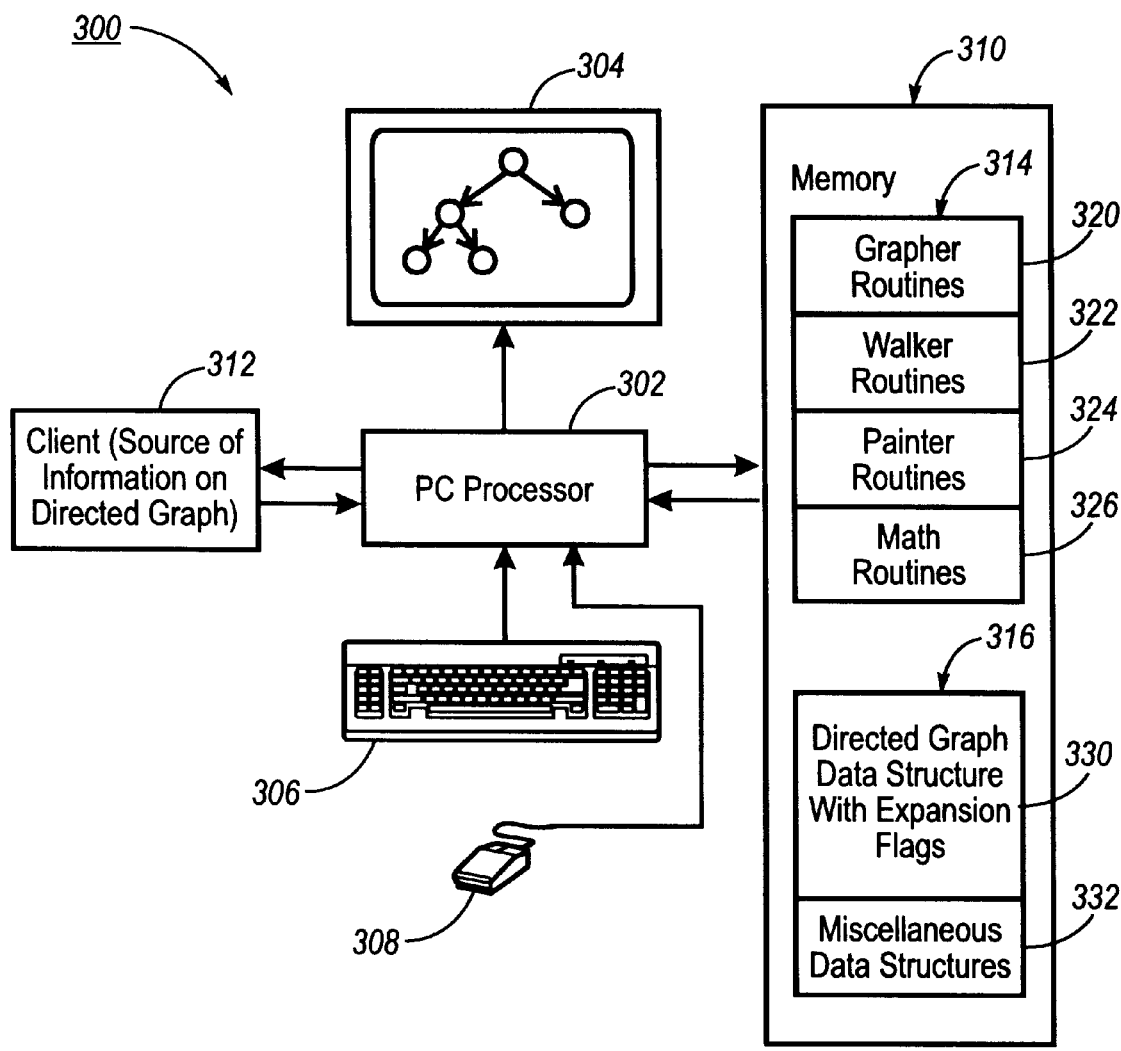
FIG. 5 is a schematic diagram of a system.

In FIG. 5, system 300 includes PC processor 302, which is connected to display 304 for presenting images and to keyboard 306 and mouse 308 for providing signals from a user. PC processor 302 is also connected so that it can access memory 310 and client 312. Memory 310 can illustratively include program memory 314 and data memory 316. Client 312 is a source of information about a directed graph, which could be a combination of routines and data stored in memory 310 or could be independent of memory 310 as shown. For example, processor 302 could communicate with client 312 through a network.

The routines stored in program memory 314 can be grouped into several functions. Grapher routines 320 create and modify a data structure representing the directed graph defined by the information from client 312. Walker routines 322 respond to navigation signals and other user signals from keyboard 306 and mouse 308 by obtaining information from the directed graph data structure. Painter routines 324 provide signals to display 304 to cause it to present representations of the directed graph data structure. Math routines 326 can be called to obtain positions of elements of the directed graph in a layout space.

Data memory 316 in turn contains data structures accessed by processor 302 during execution of routines in program memory 314. Directed graph data structure 330, as noted above, can be created and modified by grapher routines 320 and can also be accessed by walker routines 322 and painter routines 324. As shown directed graph data structure 330 includes expansion flags, an example of how expansion/contraction data can be implemented. The routines in program memory 314 can also access various miscellaneous data structures 332. Data structures 332 may, for example, include an extra data structure for mapping from a pair of node IDs to a link ID, implemented as a standard heap; this extra data structure allows lookup and insertion of a link ID in time that is logarithmic in the number of links.

C.3. Directed Graph Data Structure

Figure 6:
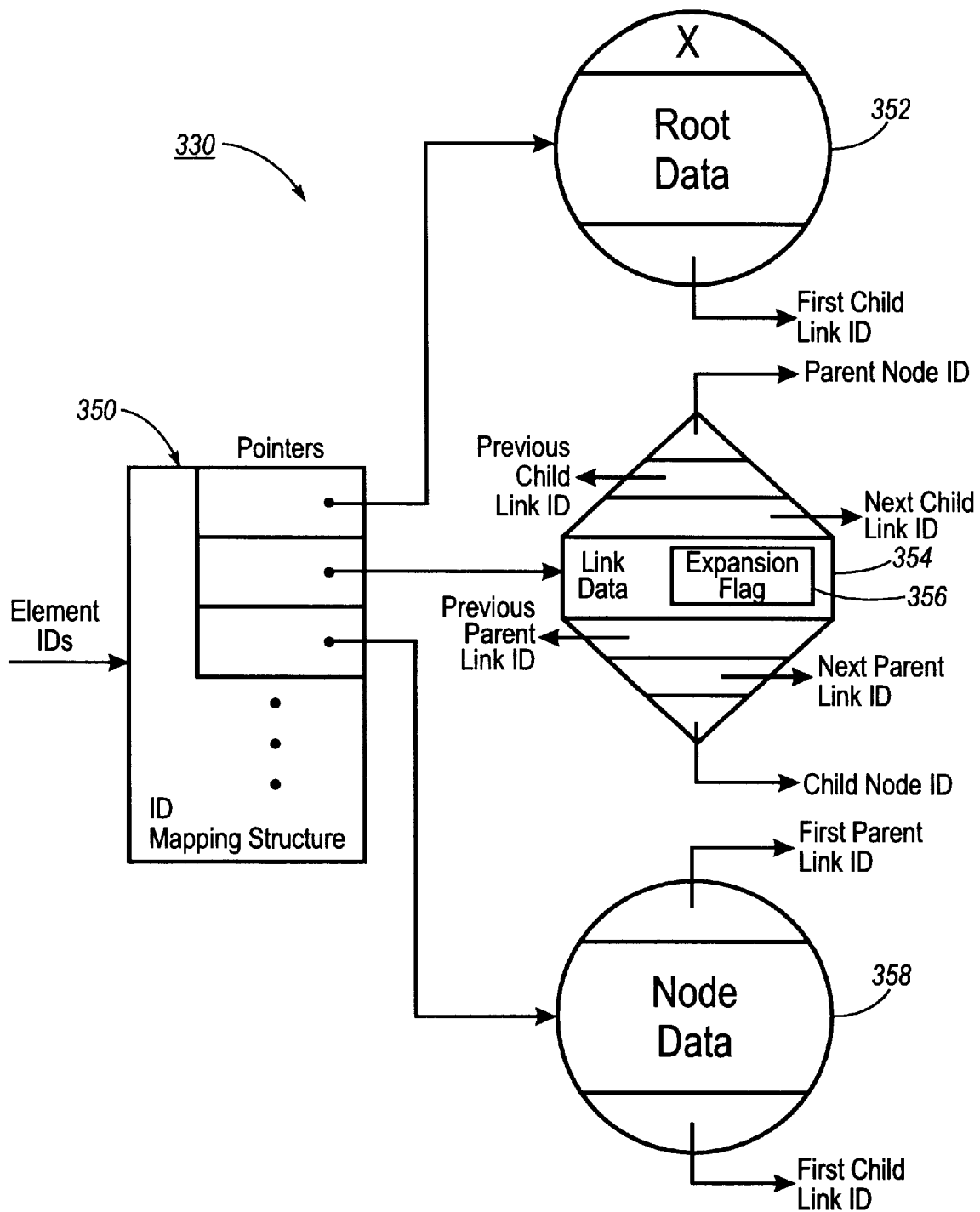
FIG. 6 is a schematic diagram of a directed graph data structure.

FIG. 6 illustrates features of directed graph data structure 330 that are relevant to the operations performed by grapher routines 320 in relation to the expansion flags.

Identifier (ID) mapping structure 350 maps from element IDs to pointers. The element IDs include node IDs and link IDs. Structure 350 makes it possible for every node and link in memory to be specified by an ID which can be validated in constant time and nearly always created in constant time; structure 350 avoids the need to use pointers except within directed graph data structure 330. Although implemented as two arrays of pointers, one indexed by the node IDs and the other by link IDs, structure 350 could also be, for example, a lookup table in which each entry includes an ID and a pointer.

Root node element 352 represents a special node that is always in memory and whose children can be chosen by client 312 according to any appropriate criterion. For example, the children of root node element 352 could include links to all other nodes, to all other nodes that have no other parent, or only to one node that is the natural starting node of structure 330, such as a node representing a file system root or a web site home page. Therefore, the upper level of element 352 has an "x" to indicate that it has no parent, while the lower level has the ID of its first child link. The central level of element 352 may contain appropriate data relevant to the root node it represents.

Link element 354 represents a link between a parent node and a child node, the IDs of which are in its uppermost and lowermost levels. The two levels just below the parent node's ID are the IDs of the previous child link and the next child link from the parent node, respectively. Similarly, the two levels just above the child node's ID are the IDs of the previous parent link and the next parent link leading to the child node, respectively.

As in element 352, the central level of element 354 may contain appropriate data relevant to the link it represents. As illustrated, the link data include expansion flag 356, a flag indicating whether the link's to-node in a tree within the graph is expanded or contracted. The link data can also include additional items of data, such as to indicate a previous tree. In one implementation, the link data relating to a previous tree include three additional flags, one each to indicate whether the most recent action performed on the tree added, removed, or toggled the link between expanded and contracted. These flags are useful for quickly switching between a representation of the previous tree and the modified tree, by providing information that can be used to decide which elements to traverse, such as during layout and mapping. Related techniques are described in copending coassigned U.S. patent applications Ser. No. 09/AAA,AAA (Attorney Docket No. D/98205), entitled "Presenting Node-Link Structures with Modification"; 09/BBB,BBB (Attorney Docket No. D/98205Q1), entitled "Local Relative Layout of Node-Link Structures in Space with Negative Curvature"; and 09/CCC,CCC (Attorney Docket No. D/98205Q2) entitled "Mapping a Node-Link Structure to a Rendering Space Beginning from any Node", all incorporated herein by reference.

Node element 358 represents a node that is currently in memory but that is subject to being removed in accordance with the memory management techniques described in copending coassigned U.S. patent application Ser. No. 09/DDD,DDD (Attorney Docket No. D/98205Q3), entitled "Controlling Which Part of Data Defining a Node-Link Structure is in Memory", incorporated herein by reference. Therefore, the upper level of element 358 has the ID of its first parent link and the lower level has the ID of its first child link. As with element 352, the central level of element 358 may contain appropriate data relevant to the node it represents. For example, the central level may include a pointer to the node's entry in the list of node IDs described below, thus allowing removal of the node's entry from the list in constant time without performing a search.

As can be understood from FIG. 6 and the description below in relation to FIG. 8, not all of the links of a directed graph are concurrently represented by instances of link element 354. Thus, the expansion flags define the set of links in the tree by indicating, for each link in data structure 330, whether the outgoing links of its to-node would be in the set of links in the tree if the link itself were in the set of links in the tree.

C.4. Operations

Figure 7:
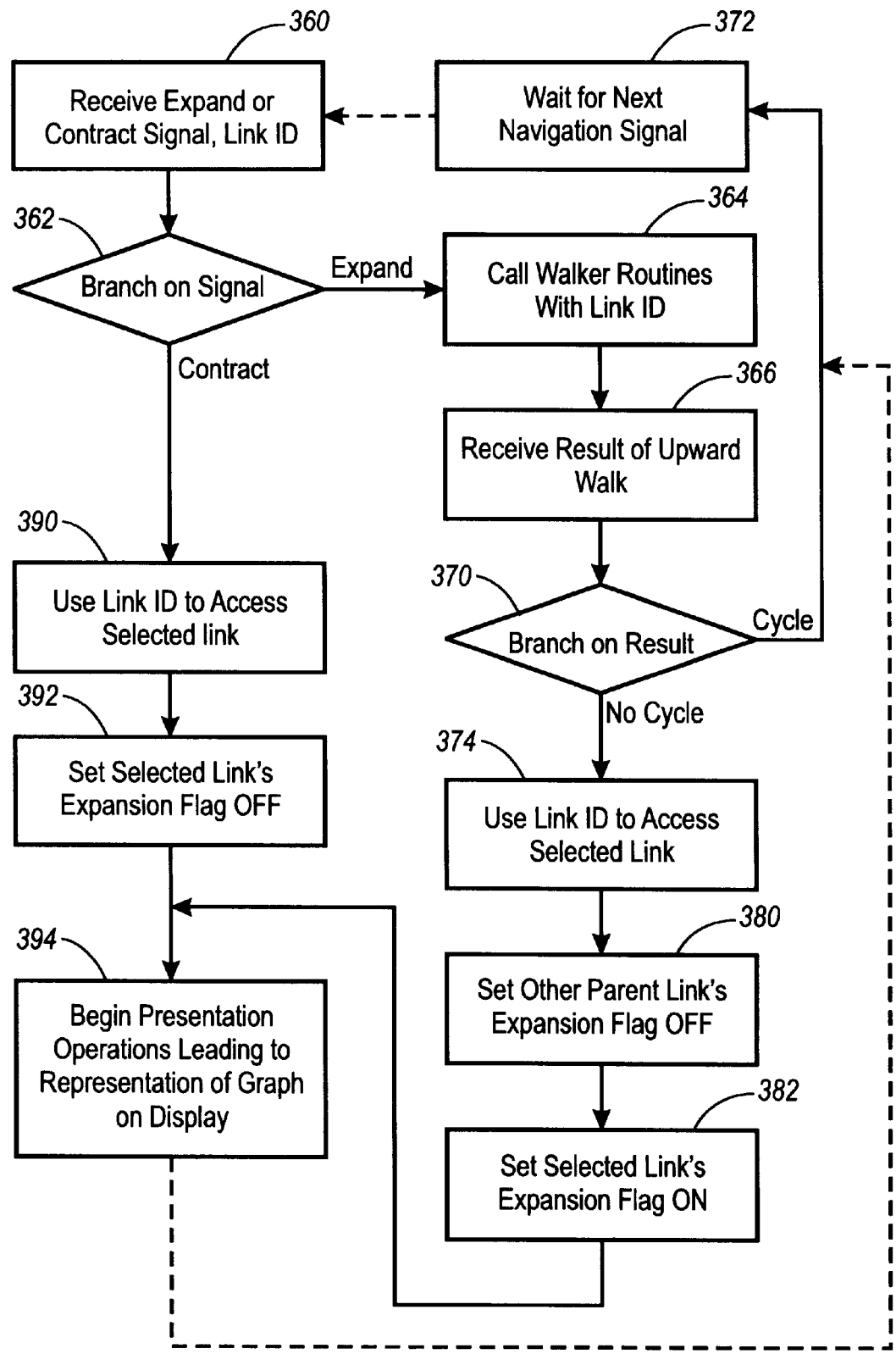
FIG. 7 is a flow chart showing how the client in FIG. 5 responds to a signal requesting that a node be expanded or contracted.
Figure 8:
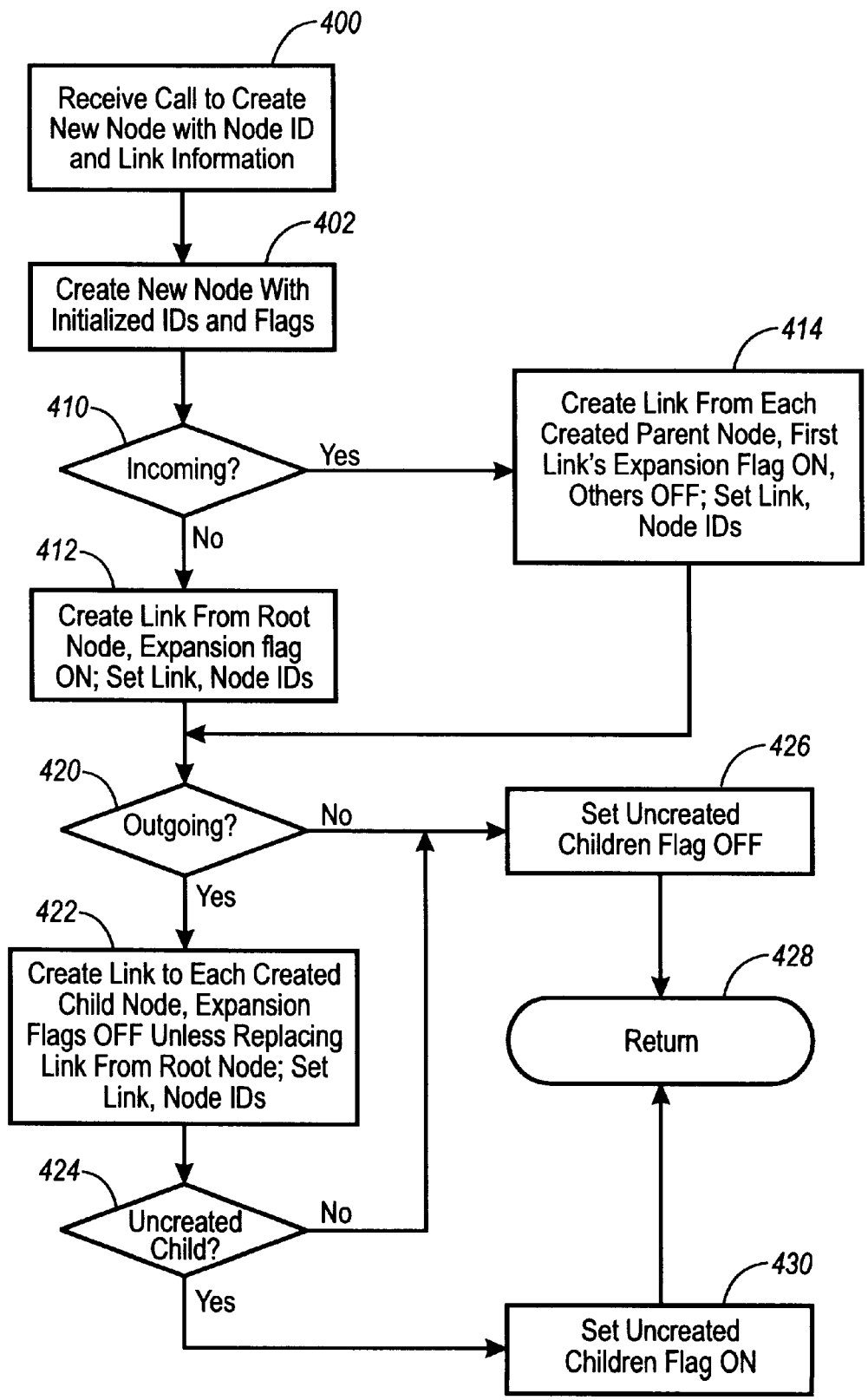
FIG. 8 is a flow chart showing how the grapher routines in FIG. 5 create a node in the data structure of FIG. 6.

FIGS. 7 and 8 show operations that relate to expansion flags 356. FIGS. 7 relates to operations of client 312, while FIG. 8 relates to operations of grapher routines 320.

In FIG. 7, client 312 begins the illustrated operations upon receiving an expand signal or a contract signal with a link ID in box 360. The expand or contract signal could be received from mouse 308, and could be a double click on a toggle icon that indicates whether a node is expanded or contracted, such as with "−" to indicate the node is expanded and "+" to indicate it is contracted. The toggle icon could be presented on display 304 within or adjacent to a feature representing the node to which it relates. The link ID received in box 360 is that of the parent link leading to the occurrence of the node feature.

Client 312 branches in box 362 based on the signal received in box 360. If an expand signal, which could be received if a user double clicks on "+" to expand a contracted node, client 312 can call walker routines 322 with the link ID, in box 364, to perform an upward walk to determine whether any of the node's ancestors is a clone of the node, in which case cycling can be avoided by not expanding the node. In box 366, client 312 receives the result of the upward walk, and in box 370, client 312 branches on the result.

If the result of the upward walk indicates that a cycle was found, such as an ancestor that is a clone of the to-node of the link, then client 312 ignores the expand signal received in box 360, and waits for the next navigation signal in box 372. The operations in boxes 364, 366, 370, and 372 thus closely resemble those described in relation to boxes 302 and 304 of FIG. 7 of copending coassigned U.S. patent application Ser. No. 09/DDD,DDD (Attorney Docket No. D/98205Q3) entitled "Controlling Which Part of Data Defining a Node-Link Structure is in Memory", incorporated herein by reference.

When the result of the upward walk indicates that a cycle was not found, client 312, through appropriate calls to grapher routines 320, modifies expansion flags. In box 374, grapher routines 320 use the link ID to access the link selected in box 360. By accessing expansion flag 356 in each of the parent links in the same linked list, grapher routines 320 set expansion flag 356 in all other parent links OFF, in box 380. Then, in box 382, grapher routines 320 set expansion flag 356 in the selected link ON.

Similarly, if a contract signal was received in box 360, which could be received if a user double clicks on "−" to contract an expanded node, client 312, through appropriate calls to grapher routines 320, modifies the selected link's expansion flag 356. In box 390, grapher routines 320 use the link ID to access the selected link. Then, in box 392, grapher routines 320 set expansion flag 356 in the selected link OFF.

By setting expansion flags in boxes 380, 382, and 392, grapher routines 320 change the tree that is defined within the graph. In box 394, client 312 then initiates presentation operations leading to a representation of the graph on display 304, thus beginning the operations described in relation to box 306 and subsequent boxes of FIG. 7 of copending coassigned U.S. patent application Ser. No. 09/DDD,DDD (Attorney Docket No. D/98205Q3) entitled "Controlling Which Part of Data Defining a Node-Link Structure is in Memory", incorporated herein by reference. As will be understood from that application, presentation of the tree may lead to removal and creation of nodes, but the representation that is ultimately represented will be based on a tree defined by expansion flags in the manner explained above. As will be further understood from that application, client 312 could, for example, make calls invoking operations like those described in copending coassigned U.S. patent application Ser. No. 09/CCC,CCC (Attorney Docket No. D/98205Q2) entitled "Mapping a Node-Link Structure to a Rendering Space Beginning from any Node", incorporated herein by reference. As will be understood from that application, the tree defined by the expansion flags is traversed to obtain a representation, and a series of representations could be presented with animation as further described in copending coassigned U.S. patent application Ser. No. 09/AAA,AAA (Attorney Docket No. D/98205), entitled "Presenting Node-Link Structures with Modification", incorporated herein by reference.

After the representation is presented in box 394, client 312 can return to wait for the next navigation signal in box 372, as described above. As can be seen, if a series of expand and contract signals is received, the technique of FIG. 7 will perform a series of iterations, each iteration responding to one of the expand or contract signals and culminating in presentation of a representation of the graph in box 394.

In FIG. 8, grapher routines 320 begin upon receiving a call to create a new node in box 400. This call can be received from memory management routines as described in relation to box 356 in FIG. 8 of copending coassigned U.S. patent application Ser. No. 09/DDD,DDD (Attorney Docket No. D/98205Q3) entitled "Controlling Which Part of Data Defining a Node-Link Structure is in Memory", incorporated herein by reference. The call includes the node ID of the new node and information about the new node's incoming and outgoing links.

Grapher routines 320 respond by creating a new node like node 358 in FIG. 6, in box 402. Grapher routines 320 also initialize the first parent link ID and the first child link ID and flags included in or related to the new node. A flag can be initialized OFF to indicate that the new node does not have any uncreated child nodes. Also, counters that can be used to determine whether the node was recently walked during layout or mapping can be initialized to an appropriate value.

Then, in box 410, grapher routines 320 branch on whether the new node has any incoming links from parent nodes that have been created.

If not, a new link is created to root node 352, in box 412. Creation of this new link includes obtaining a link ID and creating a link like link 354 in FIG. 6, with expansion flag 356 ON by default to indicate that the new node is expanded and with the node ID of root node 352 as the parent node ID and the node ID of the new node as the child node ID. In addition, other appropriate link IDs are set. For example, if this is the first outgoing link from root node 352, the new link's ID is loaded into root node 352 as its first child link ID, and the new link's previous and next child link IDs are set to NULL. Otherwise, the new link's previous child link ID is set to the last of the child links of root node 352, and that link's next child link ID is set to the new link's ID, while the new link's next child link ID is set to NULL.

If, on the other hand, the new node has one or more incoming links from parent nodes that have been created, a link is created for each of its created parent nodes, in box 414, with expansion flag 356 ON by default in only the first link and with expansion flag 356 OFF in all the other links. Each new link has the appropriate node ID as its parent node ID and the node ID of the new node as its child node ID. In addition, other appropriate IDs are set. For example, if a new link is the first outgoing link from a parent, the new link's ID is loaded into the parent node as its first child link ID, and the new link's previous and next child link IDs are set to NULL. Otherwise, the new link's previous child link ID is set to the last of the child links of the parent node, and that link's next child link ID is set to the new link's ID, while the new link's next child link ID is set to NULL. In box 414, grapher routines 320 can also check each parent node to determine whether it has any remaining uncreated children, changing its uncreated children flag to OFF if not.

Similarly, grapher routines 320 branch in box 420 based on whether the new node has any outgoing links. If so, a new link is created to each created child, in box 422. Creation of this new link includes obtaining a link ID and creating a link like link 354 in FIG. 6. The new link's expansion flag 356 is set OFF to indicate that the new node is contracted unless the new link is replacing a link from root node 352, in which case it is the first incoming link of the child node, so that expansion flag 356 is set ON by default and the child node's first parent link ID is the new link's ID. The new link also has the node ID of the new node as its parent node ID and the node ID of the child node as its child node ID. In addition, other appropriate link IDs are set. For example, if this is the first outgoing link from the new node, the new link's ID is loaded into the new node as its first child link ID, and the new link's previous and next child link IDs are set to NULL. Otherwise, the new link's previous child link ID is set to the last of the child links of the new node, and that link's next child link ID is set to the new link's ID, while the new link's next child link ID is set to NULL. Similarly, unless the new link is replacing a link from root node 352, in which case its previous and next parent link IDs are NULL, the new link's previous parent link ID is set to the last of the parent links of the child node, and that link's next parent link ID is set to the new link's ID, while the new link's next parent link ID is set to NULL.

After creating outgoing links to created children, grapher routines 320 test in box 424 whether the new node has any uncreated children. If not, or if the new node has no outgoing links, the uncreated children flag is set OFF in box 426 before returning in box 428. But if there is at least one uncreated child, the uncreated children flag is set ON in box 430 before returning in box 428.

A related technique for removing nodes is described in relation to FIG. 11 of copending coassigned U.S. patent application Ser. No. 09/DDD,DDD (Attorney Docket No. D/98205Q3) entitled "Controlling Which Part of Data Defining a Node-Link Structure is in Memory", incorporated herein by reference. The technique described there may also affect expansion flags indirectly, such as by deleting links with expansion flags ON, but does not otherwise affect expansion flags.

C.5. Examples

Figure 9:
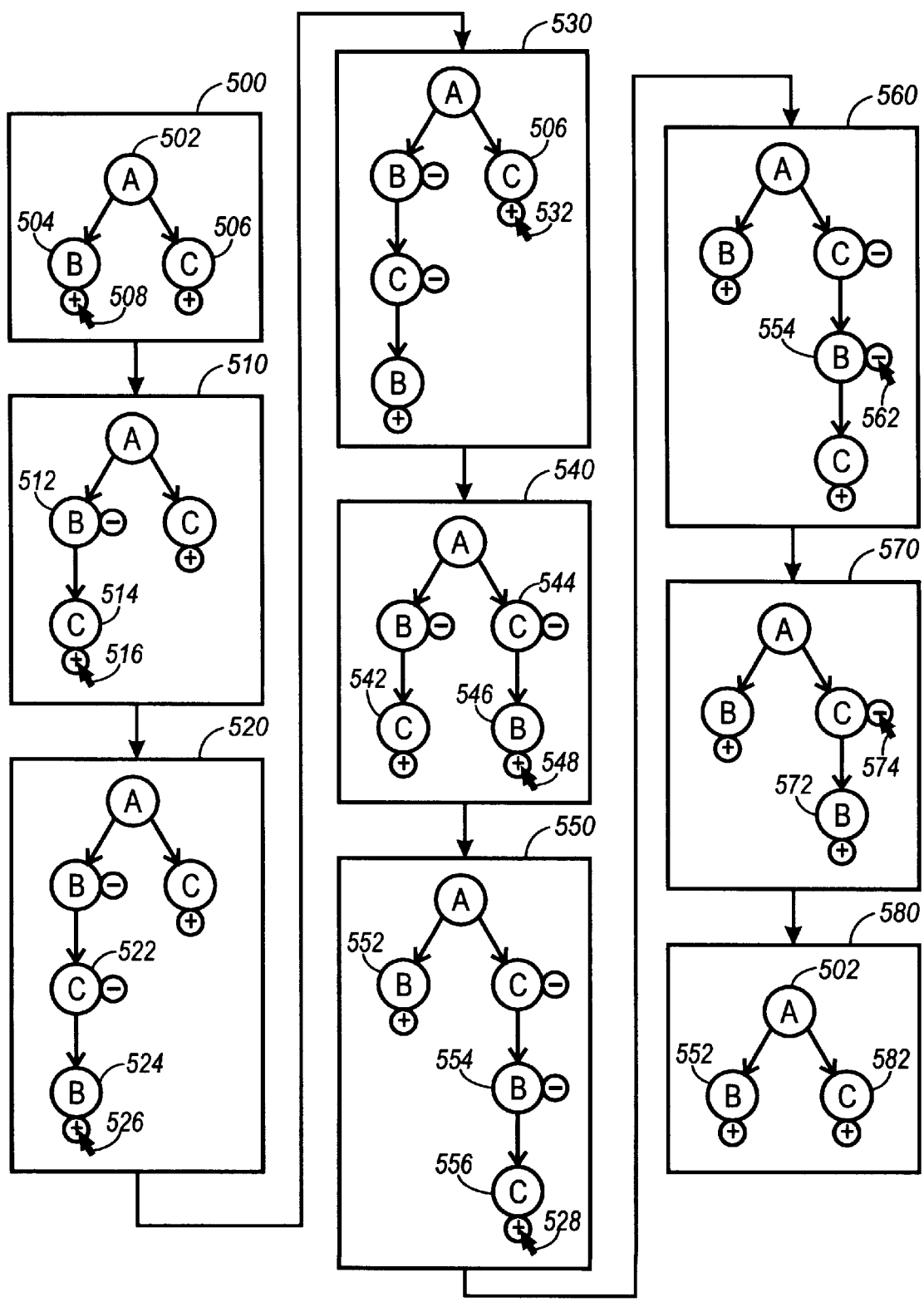
FIG. 9 is a schematic diagram showing a sequence of representations of a graph with different combinations of expanded and contracted nodes.

FIG. 9 shows a sequence of representations of the graph shown in box 202 in FIG. 4 that could be presented as a result of operations like those described above in relation to FIG. 7, without creating or removing any nodes. Each representation could result from a respective iteration in FIG. 7, either an iteration through boxes 364 through 382 in response to an expand signal or an iteration through boxes 390 and 392 in response to a contract signal. In each representation, a node feature with a "+" indicates that the represented node is contracted in the tree, while a node feature with a "−" indicates that the represented node is expanded in the tree.

The representation in box 500 includes node features 502, 504, and 506, respectively labeled "A", "B", and "C". This representation results when the expansion flags of the links from A to B and from A to C are both OFF; in FIG. 7, the expansion flags of the other two links, from B to C and from C to B, are also OFF at this point. As a result, node features 504 and 506 both include a "+" that can be clicked to provide an expand signal. As indicated by pointer 508, the user is clicking the "+" in node feature 504, requesting expansion.

The representation in box 510 results from expansion of node feature 504, which sets the expansion flag of the link from A to B ON in box 382 in FIG. 7, leaving the other three expansion flags OFF. Node feature 512 replaces node feature 504, and includes a "−" that can be clicked to provide a contract signal. Node feature 514 has been added, with a "+", and pointer 516 indicates that the user is now clicking the "+", requesting expansion.

The representation in box 520 results from expansion of node feature 514, which sets the expansion flag of the link from B to C ON in box 382 in FIG. 7, leaving the other three expansion flags unchanged. Node feature 522 replaces node feature 514, and includes a "−", while node feature 524 has been added, with a "+". Pointer 526 indicates that the user is now clicking the "+", requesting expansion.

As a result of the call in box 364 in FIG. 7, walker routines 322 perform an upward walk each time expansion is requested. In response to the request to expand node feature 524, however, the upward walk will find a cycle, because node feature 512 is a clone of node feature 524, both representing the same node in the graph. Therefore, the request to expand node feature 524 is ignored and none of the expansion flags are changed. The representation in box 530 is the same as in box 520, except pointer 532 indicates that the user is now clicking the "+" in node feature 506, requesting expansion.

The representation in box 540 results from expansion of node feature 506, which sets the expansion flag of the link from B to C OFF in box 380 in FIG. 7, to prevent node C from having two expanded incoming links. Then, the expansion flag of the link from A to C is set ON in box 382, while the other two expansion flags are left unchanged. Node feature 542, with a "+", replaces node feature 522. Node feature 544, with a "−", replaces node feature 506. Node feature 546 has been added, with a "+", and pointer 548 indicates that the user is now clicking the "+", requesting expansion.

The representation in box 550 results from expansion of node feature 546, which sets the expansion flag of the link from A to B OFF in box 380 in FIG. 7, to prevent node B from having two expanded incoming links. Then, the expansion flag of the link from C to B is set ON in box 382, while the other two expansion flags are left unchanged. Node feature 552, with a "+", replaces node feature 512. Node feature 554, with a "−", replaces node feature 506. Node feature 556 has been added, with a "+", and pointer 558 indicates that the user is now clicking the "+", requesting expansion.

In response to the request to expand node feature 556, the upward walk called in box 364 in FIG. 7 will find a cycle, because node feature 544 is a clone of node feature 556, both representing the same node in the graph. Therefore, the request to expand node feature 556 is ignored and none of the expansion flags are changed. The representation in box 560 is the same as in box 550, except pointer 562 indicates that the user is now clicking the "−" in node feature 554, requesting contraction.

The representation in box 570 results from contraction of node feature 554, which sets the expansion flag of the link from C to B OFF in box 392 in FIG. 7, leaving the other three expansion flags unchanged. Node feature 556 is omitted, and node feature 572, with a "+", replaces node feature 554. Pointer 574 indicates that the user is now clicking the "−" in node feature 544, again requesting contraction.

The representation in box 580 results from contraction of node feature 544, which sets the expansion flag of the link from A to C OFF in box 392 in FIG. 7, leaving the other three expansion flags unchanged, so that all four expansion flags are again OFF as in box 500. Node feature 572 is omitted, and node feature 582, with a "+", replaces node feature 544. The representation in box 580 looks the same as the representation in box 500.

Transitions between the representations in FIG. 9 could be animated as described in copending coassigned U.S. patent application 09/AAA,AAA (Attorney Docket No. D/98205) entitled "Presenting Node-Link Structures with Modification", incorporated herein by reference.

C.6. Variations

The implementation described above could be varied in many ways within the scope of the invention.

An implementation similar to that described above has been successfully executed on processors of IBM compatible PCs, but implementations could be executed on other machines with any appropriate processors.

An implementation similar to that described above has been successfully executed using C++ in 32-bit Windows environments, but other programming languages and environments could be used, including non-object-oriented environments, and other platforms could be used, such as Lisp, a Unix environment, ANSI C, Pascal, and so forth.

An implementation similar to that described above has been successfully executed with node-link data presented in a generic XML format and in an experimental format, but the invention could be implemented with any suitable type of node-link data, whether static or dynamic, and accessible in any appropriate way, such as in memory or over a network.

An implementation similar to that described above has been successfully executed with navigation signals received from a keyboard and a mouse, including expand and contract signals received from a mouse by double clicking on "+" and "−" features, and relating to a displayed representation or animated series of representations of a node-link structure like the representations disclosed in Lamping et al., U.S. Pat. No. 5,619,632 and in copending coassigned U.S. patent application Ser. No. 09/AAA,AAA (Attorney Docket No. D/98205), entitled "Presenting Node-Link Structures with Modification", both incorporated herein by reference. The invention could, however, be implemented with or without navigation signals; for example, elements could be moved around in response to different sortings of the children of a node or in response to the application of different filters to elements of a structure. Also, the invention could be implemented with any appropriate type of expand and contract signals or other navigation signals, including signals resulting from external queries, selection of a menu entry-like item requesting expansion below an indicated node or link, or selection of a menu entry-like item requesting expansion below the current focus. The navigation signals could instead relate to an illusory space like those produced by videogames or virtual reality environments or a presentation space other than a display and navigation signals could instead be produced by any appropriate user input device, including other kinds of pointing devices and other kinds of devices for receiving alphanumeric or linguistic input such as voice, gestures, or other modes of user input. Further, the invention could be implemented with other types of representations of node-link structures, and with ways of indicating when an element is contracted or expanded other than "+" and "−" features. The invention could be implemented without animation or with any appropriate animation techniques.

An implementation similar to that described above has been implemented with each iteration responding to an expand or contract signal from a user by changing tree defining data and then preparing and presenting a representation of a graph, but the invention could be implemented with other types of iterations invoked by other types of signals or calls and that respond differently.

An implementation similar to that described above has been implemented with layout data obtained in the manner described in copending coassigned U.S. patent application Ser. No. 09/BBB,BBB (Attorney Docket No. D/98205Q1), entitled "Local Relative Layout of Node-Link Structures in Space with Negative Curvature", incorporated herein by reference, but the invention could be implemented with or without layout as such, or by obtaining layout data in other ways, such as by laying out the entire node-link structure separately for each representation or by laying out the node-link structure in other ways.

An implementation similar to that described above has been implemented with a node-link structure mapped into the unit disk and then painted in accordance with copending coassigned U.S. patent application Ser. No. 09/CCC,CCC (Attorney Docket No. D/98205Q2), entitled "Mapping a Node-Link Structure to a Rendering Space Beginning from any Node", incorporated herein by reference, but the invention could be implemented with or without mapping, or with a node-link structure mapped and presented in any other appropriate way, including mapping it into any other appropriate rendering space and presenting it in any other appropriate display space, including three-dimensional rendering and display spaces.

The implementation described above uses node-link data that include expansion flags of links to define a tree within a graph, the expansion flags indicating whether to-nodes of links are expanded or contracted in the tree. As described above, the implementation also uses additional flags that indicate whether a link was added, removed, or toggled between expanded and contracted states by the most recent action. Tree defining data of various other kinds could be used to define a tree within a graph, including various kinds of data to indicate which representations of an element in the graph have descendants and which have none or to indicate the incoming link of each representation of an element. As described above, tree defining data could take any appropriate form, whether in line and available by direct reference or available by indirect reference, such as through a handle or pointer.

The implementation described above employs a directed graph data structure in which a link is represented as an item in two linked lists, one for the outgoing links from its from-node and one for the incoming links to its to-node. Any other suitable data structure could be employed.

The implementation described above can handle directed graphs, including cyclic directed graphs, but the invention could be implemented for other types of graphs by converting other types of links to appropriate combinations of directed links or by otherwise providing a protocol for mapping the structure of a graph to a tree. For example, an undirected link between two nodes could be converted to a pair of directed links between the same nodes or could be assigned a direction based on an appropriate criterion. In general, a representation in which all undirected links have been converted to a pair of directed links is likely to be visually confusing, because each pair of directed links results in a cycle, but this confusing might be overcome by presenting cycles in another way.

The implementation described above obtains node-link data in memory that define a graph that is part of a larger graph, which could be thought of as a "protograph", and with the part of node-link data in memory being modified as described in copending coassigned U.S. patent application Ser. No. 09/DDD,DDD (Attorney Docket No. D/98205Q3), entitled "Controlling Which Part of Data Defining a Node-Link Structure is in Memory", incorporated herein by reference. The invention could be implemented, however, with node-link data in memory defining a complete graph or using other memory management techniques to control which part of node-link data is in memory.

The implementation described above detects a cycle by performing an upward walk to detect a clone. But various other measures could be taken to avoid the problem of cycles.

In the implementation described above, acts are performed in an order that could in many cases be modified.

Also, in the implementation described above, several software portions are distinguished, such as grapher, walker, painter, and math routines and the client, but the invention could be implemented with other combinations of hardware and software and with software organized in any appropriate way.

D. Applications

The invention has been applied in providing an interactive browser of node-link structures. The invention could be applied in a variety of contexts in which node-link structures are visualized. In particular, the invention could be applied in visualizing web-related structures such as the structure formed by a cached set of web pages or other web objects.

More generally, the invention could be applied to provide a browser for organization charts, file system hierarchies, hypertext hierarchies, world wide web connectivity structures, parts breakdowns, SGML structures, or any other large node-link structures. The browser could be used in editing structures or their contents.

E. Miscellaneous

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method of obtaining node-link data; the method comprising:

(A) obtaining node-link data defining a graph;

in which (A) comprises:

obtaining tree defining data that are included in the node-link data; the node-link data with the tree defining data further defining a tree within the graph; the tree defining data indicating a set of elements in the graph that are represented in the tree; a subset of elements in the set being represented more than once in the tree; for at least one element in the subset, the tree defining data indicating which representations of the element have descendants in the tree and which representations of the element have no descendants in the tree.

2. The method of claim 1 in which the tree defining data comprise expansion/contraction data indicating, for each link in the set of elements, whether the link's to-node is expanded or contracted.

3. The method of claim 2 in which the expansion/contraction data include, for each link in the set of elements, a flag indicating whether the link's to-node is expanded or contracted.

4. The method of claim 3 in which the expansion/contraction data include, for the incoming links of each node in the set of elements, at most one link with a flag indicating that the node is expanded.

5. The method of claim 1 in which the tree defining data indicate at most one representation of the element in the tree that has descendants, all other representations of the element in the tree having no descendants.

6. The method of claim 1 in which (A) further comprises a series of iterations, each iteration obtaining respective tree defining data.

7. The method of claim 6 in which each iteration comprises:

receiving a navigation signal from a user;

responding to the navigation signal by obtaining the iteration's tree defining data; and using the node-link data including the iteration's tree defining data to present a representation of the graph.

8. The method of claim 7 in which the navigation signal is an expand signal or a contract signal.

9. The method of claim 8 in which the navigation signal further indicates a node feature in the representation presented in the preceding iteration, the node feature representing a node in the graph, the representation further including a link feature leading to the node feature, the link feature representing an incoming link to the node in the graph.

10. The method of claim 9 in which the navigation signal is an expand signal, the act of obtaining the iteration's tree defining data comprising:

modifying the previous iteration's tree defining data to indicate that the incoming link represented by the link feature is expanded and that all other incoming links to the node in the graph are contracted.

11. The method of claim 9 in which the navigation signal is a contract signal, the act of obtaining the iteration's tree defining data comprising:

modifying the previous iteration's tree defining data to indicate that the incoming link represented by the link feature is contracted.

12. The method of claim 9 in which the node feature includes an indication of whether the node it represents is expanded or contracted in the tree.

13. A system for obtaining node-link data, the system comprising:

a processor for obtaining node-link data defining a graph; the processor, in obtaining the node-link data, obtaining tree defining data that are included in the node-link data; the node-link data with the tree defining data further defining a tree within the graph; the tree defining data indicating a set of elements in the graph that are represented in the tree; a subset of elements in the set being represented more than once in the tree; for at least one element in the subset, the tree defining data indicating which representations of the element have descendants in the tree and which representations of the element have no descendant in the tree.

14. An article of manufacture for use in a system that includes:

a storage medium access device; and a processor connected for receiving data accessed on a storage medium by the storage medium access device;

the article of manufacture comprising:

a storage medium; and instruction data stored by the storage medium; the instruction data indicating instructions the processor can execute; the processor, in executing the instructions, obtaining node-link data defining a graph; the processor, in obtaining the node-link data, obtaining tree defining data that are included in the node-link data; the node-link data with the tree defining data further defining a tree within the graph; the tree defining data indicating a set of elements in the graph that are represented in the tree; a subset of elements in the set being represented more than once in the tree; for at least one element in the subset, the tree defining data indicating which representations of the element have descendants in the tree and which representations of the element have no descendants in the tree.

15. A method of transferring data between first and second machines over a network, the second machine including memory and a processor connected for accessing the memory; the memory being for storing instruction data; the method comprising:

establishing a connection between the first and second machines over the network; and operating the first and second machines to transfer instruction data from the first machine to the memory of the second machine; the instruction data indicating instructions the processor can execute; the processor, in executing the instructions, obtaining node-link data defining a graph; the processor, in obtaining the node-link data, obtaining tree defining data that are included in the node-link data; the node-link data with the tree defining data further defining a tree within the graph; the tree defining data indicating a set of elements in the graph that are represented in the tree; a subset of elements in the set being represented more than once in the tree; for at least one element in the subset, the tree defining data indicating which representations of the element have descendants in the tree and which representations of the element have no descendants in the tree.

* * * * *